(12) United States Patent
Gaillard et al.

(10) Patent No.: US 12,031,455 B2
(45) Date of Patent: Jul. 9, 2024

(54) TURBOMACHINE TURBINE HAVING CMC NOZZLE WITH LOAD SPREADING

(71) Applicant: SAFRAN AIRCRAFT ENGINES, Paris (FR)

(72) Inventors: Aurélien Gaillard, Moissy-Cramayel (FR); Antoine Claude Michel Etienne Danis, Moissy-Cramayel (FR); Clément Jarrossay, Moissy-Cramayel (FR); Gilles Gérard Claude Lepretre, Moissy-Cramayel (FR); Nicolas Paul Tableau, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 17/617,565

(22) PCT Filed: Jun. 1, 2020

(86) PCT No.: PCT/FR2020/050928
§ 371 (c)(1),
(2) Date: Dec. 8, 2021

(87) PCT Pub. No.: WO2020/249886
PCT Pub. Date: Dec. 17, 2020

(65) Prior Publication Data
US 2022/0228498 A1  Jul. 21, 2022

(30) Foreign Application Priority Data
Jun. 12, 2019 (FR) ........................................ 1906244

(51) Int. Cl.
*F01D 9/04* (2006.01)
*F01D 5/18* (2006.01)

(52) U.S. Cl.
CPC ............... *F01D 9/04* (2013.01); *F01D 5/18* (2013.01); *F05D 2220/323* (2013.01); *F05D 2240/12* (2013.01); *F05D 2240/30* (2013.01)

(58) Field of Classification Search
CPC .......... F01D 9/041; F01D 9/044; F01D 9/042; F01D 25/12; F01D 5/188; F01D 5/284;
(Continued)

(56) References Cited

U.S. PATENT DOCUMENTS 2,925,998 A * 2/1960 Hayes ................... F01D 9/042
29/889.22
3,075,744 A * 1/1963 Peterson ................ F01D 5/187
415/137

(Continued)

FOREIGN PATENT DOCUMENTS

| EP | 3121379 A1 | 1/2017 |
|----|-----------|--------|
| EP | 3144479 A1 | 3/2017 |

(Continued)

OTHER PUBLICATIONS

International Search Report in International Application No. PCT/FR2020/050928, mailed Sep. 17, 2020 (4 pages).

(Continued)

*Primary Examiner* — Brian Christopher Delrue
(74) *Attorney, Agent, or Firm* — Bookoff McAndrews, PLLC (57) ABSTRACT

Turbine comprising a casing and a nozzle including a metal outer shroud integral with the casing, a metal inner shroud, and a plurality of nozzle sectors of CMC forming a ring extending between the metal outer shroud and the metal inner shroud, each sector including a mast, an inner platform, an outer platform and at least one airfoil having a hollow profile defining an inner recess, each of the inner and outer platforms having an opening communicating with said (Continued)

inner recess, and the mast passing through said openings and the inner recess and being attached to said casing and connected with said nozzle sector. The mast comprises at least one fastening projection having at least one portion extending from a radially outer end of the mast in a direction opposite to the center of the mast and in a plane orthogonal to the radial direction.

14 Claims, 4 Drawing Sheets

(58) Field of Classification Search
CPC .. F01D 5/147; F05D 2220/32; F05D 2240/12; F05D 2260/20; F05D 2300/20
See application file for complete search history.

(56) References Cited

U.S. PATENT DOCUMENTS

| | | | |
|---|---|---|---|
| 4,563,128 A * | 1/1986 | Rossmann | F01D 5/284 |
| | | | 416/241 B |
| 4,987,944 A * | 1/1991 | Parks | B22C 9/04 |
| | | | 164/112 |
| 5,197,856 A * | 3/1993 | Koertge | F04D 29/644 |
| | | | 415/209.2 |
| 5,207,556 A * | 5/1993 | Frederick | F01D 5/189 |
| | | | 415/115 |
| 5,332,360 A * | 7/1994 | Correia | F01D 9/044 |
| | | | 29/889.21 |
| 5,755,556 A * | 5/1998 | Hultgren | F02C 7/185 |
| | | | 416/96 R |
| 6,164,903 A * | 12/2000 | Kouris | F01D 9/04 |
| | | | 415/138 |
| 6,200,092 B1 * | 3/2001 | Koschier | F01D 5/284 |
| | | | 415/200 |
| 6,884,030 B2 * | 4/2005 | Darkins, Jr. | F01D 9/042 |
| | | | 29/889.22 |
| 9,915,159 B2 * | 3/2018 | Huizenga | F01D 9/041 |
| 2013/0094951 A1 * | 4/2013 | McCaffrey | F01D 25/162 |
| | | | 29/889.71 |
| 2018/0202302 A1 | 7/2018 | Quennehen et al. | |

FOREIGN PATENT DOCUMENTS

| | | |
|---|---|---|
| FR | 2973434 A1 | 10/2012 |
| FR | 2979662 A1 | 3/2013 |
| WO | 2010061140 A1 | 6/2010 |
| WO | 2010116066 A1 | 10/2010 |
| WO | 2010146288 A1 | 12/2010 |
| WO | 2011080443 A1 | 7/2011 |

OTHER PUBLICATIONS

Written Opinion of the International Searching Authority in International Application No. PCT/FR2020/050928, mailed Sep. 17, 2020 (8 pages).

* cited by examiner

TURBOMACHINE TURBINE HAVING CMC NOZZLE WITH LOAD SPREADING

CROSS-REFERENCE TO RELATED APPLICATIONS

This application is the U.S. national phase entry under 35 U.S.C. § 371 of International Application No. PCT/FR2020/050928, filed on Jun. 1, 2020, which claims priority to French Patent Application No. 1906244, filed on Jun. 12, 2019.

TECHNICAL FIELD

The invention relates to turbomachines, particularly aeronautical turbine engines or industrial turbines comprising a nozzle of ceramic matrix composite or with a matrix at least partially of ceramic, designated hereafter CMC material.

PRIOR ART

The field of application of the invention is in particular that of aeronautical gas turbine engines. The invention is, however, applicable to other turbomachines, for example industrial turbines.

The improvement of the performance of turbomachines and the reduction of their polluting emissions leads to the contemplation of higher and higher operating temperatures.

For elements of the hot portions of turbomachines, it has therefore been proposed to used ceramic matrix composite materials denoted CMC hereafter.

CMC materials are typically formed from a fibrous reinforcement of refractory fibers, such as carbon or ceramic fibers, densified by a ceramic, or at least partially ceramic matrix.

These materials have remarkable thermo-structural properties, i.e. mechanical properties that make them able to constitute structure elements and the capacity to retain these properties at high temperatures. Moreover, CMC material have a much lower density than metallic materials used traditionally for the elements of the hot portions of turbomachines.

Thus, documents WO 2010/061140, WO 2010/116066 and WO 2011/080443 describe the manufacture of blades of turbomachine impellers of CMC with integrated platforms and heels. The use of CMC materials for turbine nozzles has also been proposed, particularly in documents WO 2010/146288, FR 2 979 662 and EP 2 443 318.

A traditional metal turbine nozzle has a ring shape composed of several sectors assembled together, each sector comprising an inner platform, an outer platform and a plurality of airfoils extending between the inner and outer platforms and attached to them. The inner platforms set side by side form an inner shroud and the outer platforms set side by side form an outer shroud. The inner and outer shrouds delimit the gas flow stream in the nozzle.

Introducing a nozzle, for example a high-pressure nozzle of CMC, allows increasing the maximum temperature tolerated compared to a metal nozzle, and thus reducing the quantity of cooling air used. This also allows increasing the performance of the turbomachine.

CMC, however, due to its properties which are very different from metal, is more sensitive to certain mechanical stresses. In fact, CMC has greater stiffness and lower dilation. It behaves better in compression, but its allowable tension stresses are lower than those of metal.

Moreover, the integration in a metal environment of a part of CMC is delicate due to differential thermal dilations between the CMC and the metal. This is even more delicate in a turbomachine, and more particularly in a high-pressure portion of the turbomachine, because the environment is very hot, which exacerbates the differences in thermal dilation coefficients between the materials, the aerodynamic loads to which a high-pressure nozzle is subjected also being very high in this turbine zone.

CMC nozzles are known, such as for example a turbine nozzle including an outer support shroud integral with a casing, an inner support shroud, and plurality of nozzle sectors of CMC forming a ring extending between the outer support shroud and the inner support shroud. Each nozzle sector is supported on the inner and outer support shrouds and includes an inner platform, an outer platform and at least one airfoil extending between the outer platform and the inner platform and attached to them.

However, there exists a need to improve known solutions as regards the deterministic retention of the CMC nozzle sector with the inner shroud, particularly in terms of axial retention of the nozzle sector in terms of spreading aerodynamic loads.

Moreover, a high pressure differential is exerted on the casing under the nozzle in the radial and axial directions. This casing serves to create a seal between the rotor and the stator. This pressure difference is the source of a load which, if it were exerted on the CMC, would be too high considering the allowables of the material.

Also known, particularly from document FR 3 061 928, is a nozzle as described above and also including a reinforcing mast extending radially inside the blades between the two platforms.

However, a solution of this type also takes up, via the mast, both the loads relating to the pressure differential below the nozzle and the aerodynamic loads on the CMC ring.

There exists therefore a need to improve the deterministic retention of the CMC nozzle of this solution.

DISCLOSURE OF THE INVENTION

The invention seeks to mitigate the disadvantages mentioned above and override the difficulties mentioned above by proposing a turbomachine turbine comprising a turbine nozzle at least partly of CMC, the assembly of which is simplified and adapted to retain the nozzle sectors deterministically while allowing the sectors to deform independently of the interfaced metal parts, and while guaranteeing satisfactory sealing.

One object of the invention proposes a turbomachine turbine comprising a casing, an annular nozzle defining an axial direction ($D_A$) and a radial direction, a metal outer support shroud integral with the casing, a metal inner support shroud. The nozzle comprises a plurality of nozzle sectors of ceramic matrix composite material forming a ring extending between the outer support shroud and the inner support shroud. The outer support shroud defines an axial direction and a radial direction.

In addition, each sector includes a mast, an inner platform, an outer platform and at least one airfoil extending radially between the inner and outer platforms and having a hollow profile defining an inner recess extending radially between the two platforms. The inner and outer platforms of each sector each have an opening communicating with said inner recess of the airfoil. The mast of each airfoil is attached to said casing, on the one hand, and connected with said nozzle sector on the other hand.

According to a general feature of the invention, the metal outer shroud comprises an opening for each mast, and for each sector the mast passes through said openings of the inner and outer platforms, said inner recess and one of the openings of the metal outer shroud, and comprises at least one fastening projection having at least one portion extending from a radially outer end in a direction opposite to the center of the mast and in, or tangentially on a plane orthogonal to the radial direction, said at least one fastening projection cooperating with a radially outer face of the outer support shroud.

The connection thus accomplished by the invention between the mast and the outer support shroud allows strongly increasing the seal between the stream defined by the annular CMC nozzle and the zone radially outside this stream, and thus improving the performance of the turbine.

This connection with improved sealing also allows eliminating numerous interface zones.

Preferably, said at least one fastening projection of the mast comprises a single portion extending over the entire circumference of the mast from a radially outer end of the mast.

According to a first embodiment of the turbine, the outer support shroud can be made in a single piece, i.e. not be sectorized. This allows mounting the mast radially from the outside of the outer support shroud and limiting as much as possible the leaks which would be present in the case of a sectorized shroud.

According to a second embodiment of the turbine, said at least one fastening projection of the mast of each airfoil can extend in a plane, and the radially outer face of the outer support shroud can comprise a facet for receiving a fastening projection for each airfoil, each facet being planar, i.e. extending in a plane defined by only two non-circular directions.

The facets made for each of the airfoils allow having a plane/plane contact between the mast and the shroud, thus improving sealing between the two elements and facilitating the positioning of the mast. The shroud is machined so as to have as many "facets" as airfoils and therefore as masts.

According to a third embodiment, the mast is hollow.

The mast thus allows bring air into the cavity radially inside the inner shroud in order to pressurize it and thus avoid the air circulating in the stream extending between the inner and outer platforms of the nozzle sector being reintroduced outside this stream and thus reducing the performance an increasing the risk of overheating of the parts.

According to a fourth embodiment of the turbine, the outer support shroud can comprise an upstream end and a downstream end in the axial direction, and a shoulder extending in the radial direction from one of the upstream or downstream ends of the outer shroud over the entire circumference of the outer support shroud, and the mast of each airfoil can comprise an anti-rotation support of the mast relative to the outer support shroud protruding in the axial direction from the radially outer end of the mast until it is supported in the axial direction against the shoulder of the outer support shroud.

The support of the mast on the shoulder of the outer support shroud allows retaining the mast, and thus the airfoil, against any rotation around a radial axis.

According to a fifth embodiment of the turbine, the outer support shroud can also comprise, for each mast, a centering pin protruding radially from said radially outer face, and the fastening projection of each mast can comprise a centering opening configured to cooperate with an associated centering pin.

The centering pin on the outer support shroud and the centering opening provided on the mast, for example on a centering projection extending from the radially outer end of the mast or directly on one of or the fastening projection(s), allows providing a first anti-rotation point.

Preferably, the centering pin is provided on a downstream portion of the outer support shroud with respect to the gas flow direction intended to pass through the stream defined by the annular CMC nozzle.

According to a sixth embodiment of the turbine, the outer support shroud can comprise, for each mast, screws and the fastening projection of each mast can comprise tapped openings, each configured to cooperate with an associated screw.

The mast can comprise at least one portion protruding in the axial direction connected with the airfoil to retain the airfoil in position.

Preferably, for each sector, the screws are arranged downstream of the mast and the centering pin is arranged upstream of the mast.

The tapped openings are preferably made in lugs provided in the fastening projection.

The invention also has as its object a turbomachine comprising a turbine as defined above.

The invention also has as its object an aircraft comprising at least one turbomachine as defined above.

DESCRIPTION OF THE EMBODIMENTS

Figure 1:
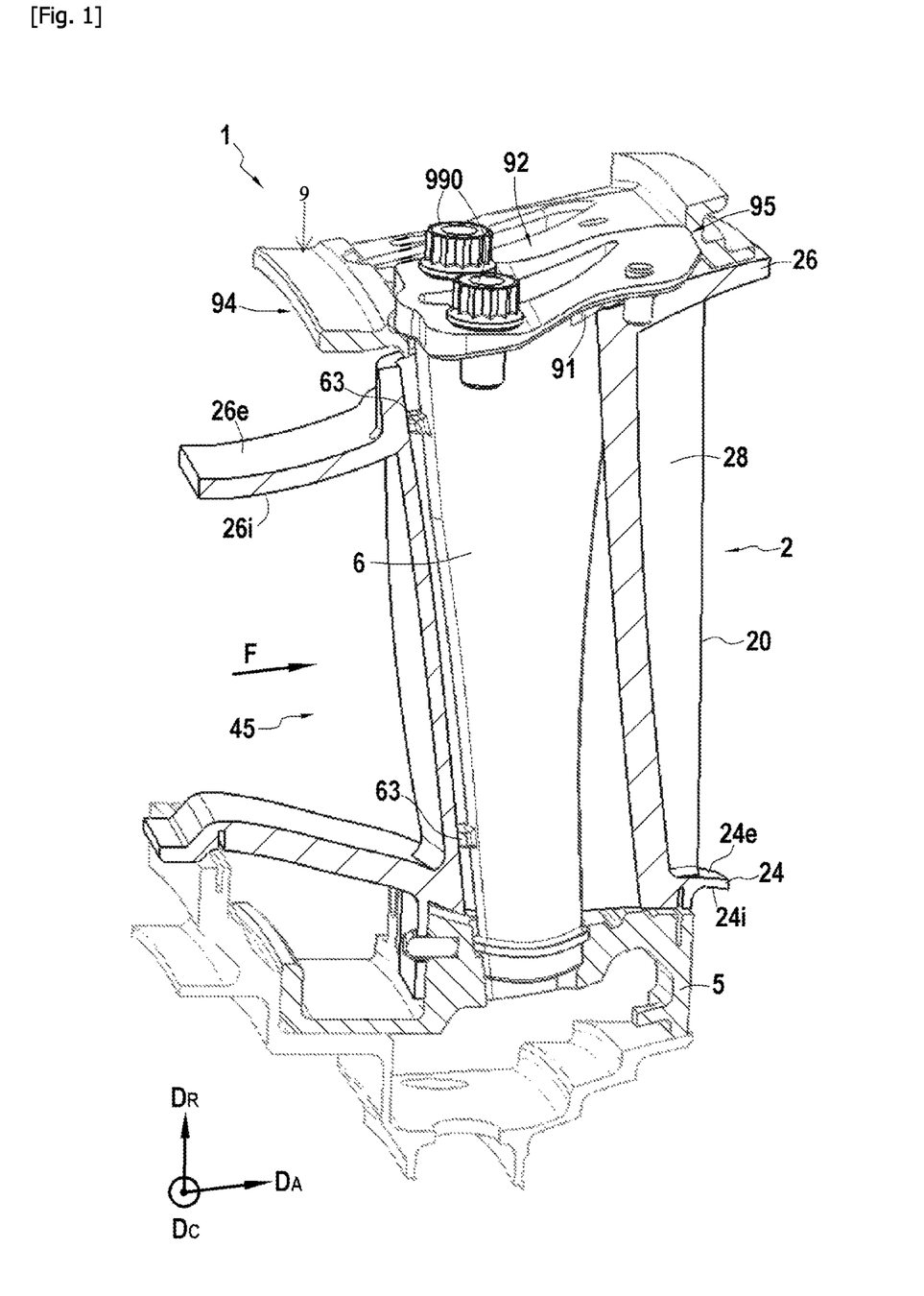
FIG. 1 is a schematic section view of a sector of a turbine according to one embodiment of the invention.

A schematic section view of a sector of a turbine according to one embodiment of the invention is illustrated in FIG. 1.

A high-pressure turbine 1 of a turbomachine 200, for example an aeronautical turbine engine, as shown partially in FIG. 1, comprises a plurality of fixed nozzles 2 which alternate with impellers in the flow direction of the gas flow F, indicated by an arrow in FIG. 1, in the turbine 1 and which are assembled in a turbine casing.

Each impeller comprises a plurality of blades having an inner shroud, and at least one airfoil extending from the inner shroud and connected to it. On the inside of the inner shroud, the blade continues with a root engaged in a recess of a disk. On the outside, the tip of the blades faces an abradable material carried by a ring to provide sealing at the tip of the blades.

In the entire present text, the terms "inner" or "internal" and "outer" or "external" are used with reference to the position or the orientation relative to the axis of rotation of the turbine 1 which defines the axial direction $D_A$ of the turbine 1.

The blades of the impeller can be traditional metal blades or blades of CNC material obtained for example as described in documents WO 2010/061140, WO 2010/116066, WO 2011/080443.

At least one of the nozzles 2 of the turbine 1 is formed by uniting several annular nozzle sectors 20 of CMC material to form a complete ring. The arrow $D_A$ indicates the axial direction of the nozzle 2 while the arrow $D_R$ indicates the radial direction of the nozzle 2 and the label $D_C$ indicates the circumferential direction.

Each nozzle sector 20 of the nozzle 2 comprises an inner platform 24, an outer platform 26 and an airfoil 28 extending between the inner and outer platforms 24 and 26 and attached to them. As a variant, several airfoils could extend between the inner and outer platforms of the same nozzle sector. Once assembled with the casing of the turbine 1, the sectors form a single nozzle ring 2 having an inner shroud formed by setting inner platforms 24 of the sectors 20 side by side and an outer shroud formed by setting outer platforms 26 of the sectors 20 side by side.

The inner shroud and the outer shroud form between them a fluid flow stream 45 inside which the gas flow F flows during the operation of the turbine 1.

In the text, the terms "upstream" and "downstream" are used with reference to the direction of flow of the gas flow F in the stream 45, indicated by an arrow.

The inner platforms 24 each have an outer surface 24e intended to be in contact with the gas flow F, and therefore arranged radially facing outer platforms 26 forming the outer shroud. The inner platforms 24 also have an inner surface 24i arranged facing the axis of rotation of the turbine 1.

The outer platforms 26 each have an outer surface 26e arranged facing the casing and formed by the surface of the second portion 262 of the outer platforms 26 oriented radially outward. The outer platforms 26 also have an outer surface 26i intended to be in contact with the gas flow F, and therefore arranged radially facing the inner platforms 24 forming the inner shroud and facing the axis of rotation of the turbine 1.

The nozzle 2 is retained between a metal inner shroud 5 and a metal outer shroud 9, between which the ring extends formed by the assembly of the ring sectors 20 of the nozzle 2. The metal outer shroud 9 is integral with the casing and has an inner surface 91 and an outer surface 92 in the radial direction $D_R$.

As illustrated in FIG. 1, each airfoil 28 has a hollow profile having an inner recess 280 extending over the entire height of the airfoil 28, i.e. between the inner platform 24 and the outer platform 26 of the ring sector 20. The inner platform 24 of each nozzle sector 20 comprises an opening 245 the shape of which corresponds to the cross section of the inner recess 280 in the plane in which the inner platform 24 extends. Likewise, the outer platform 26 of each nozzle sector 20 comprises an opening 265, the shape of which corresponds to the cross section of the inner recess 280 in the plane in which the inner platform 26 extends. The openings 245 and 265 of the inner 24 and outer 26 platforms are provided in the continuation of the inner recess 280 of the airfoil 28.

The inner recess 280 of the airfoil 28 and the openings 245 and 265 of the inner 24 and outer 26 platforms can be connected to a cooling system delivering a flow of cooling air from the casing into the airfoil 28 and the inner 24 and outer 26 platforms.

Figure 2:
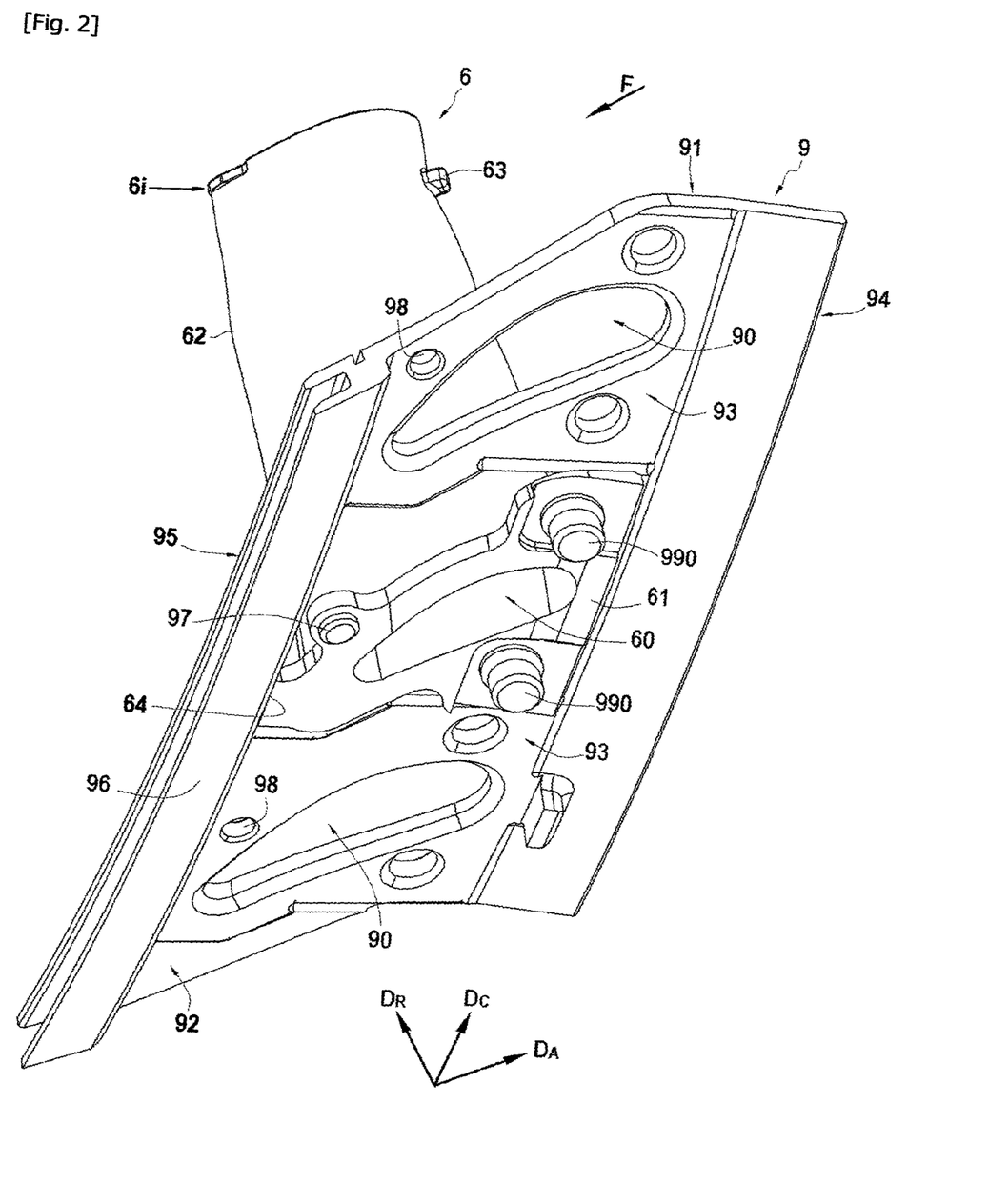
FIG. 2 is an assembled schematic view of an external support shroud and a mast of the turbine of FIG. 1.
Figure 3:
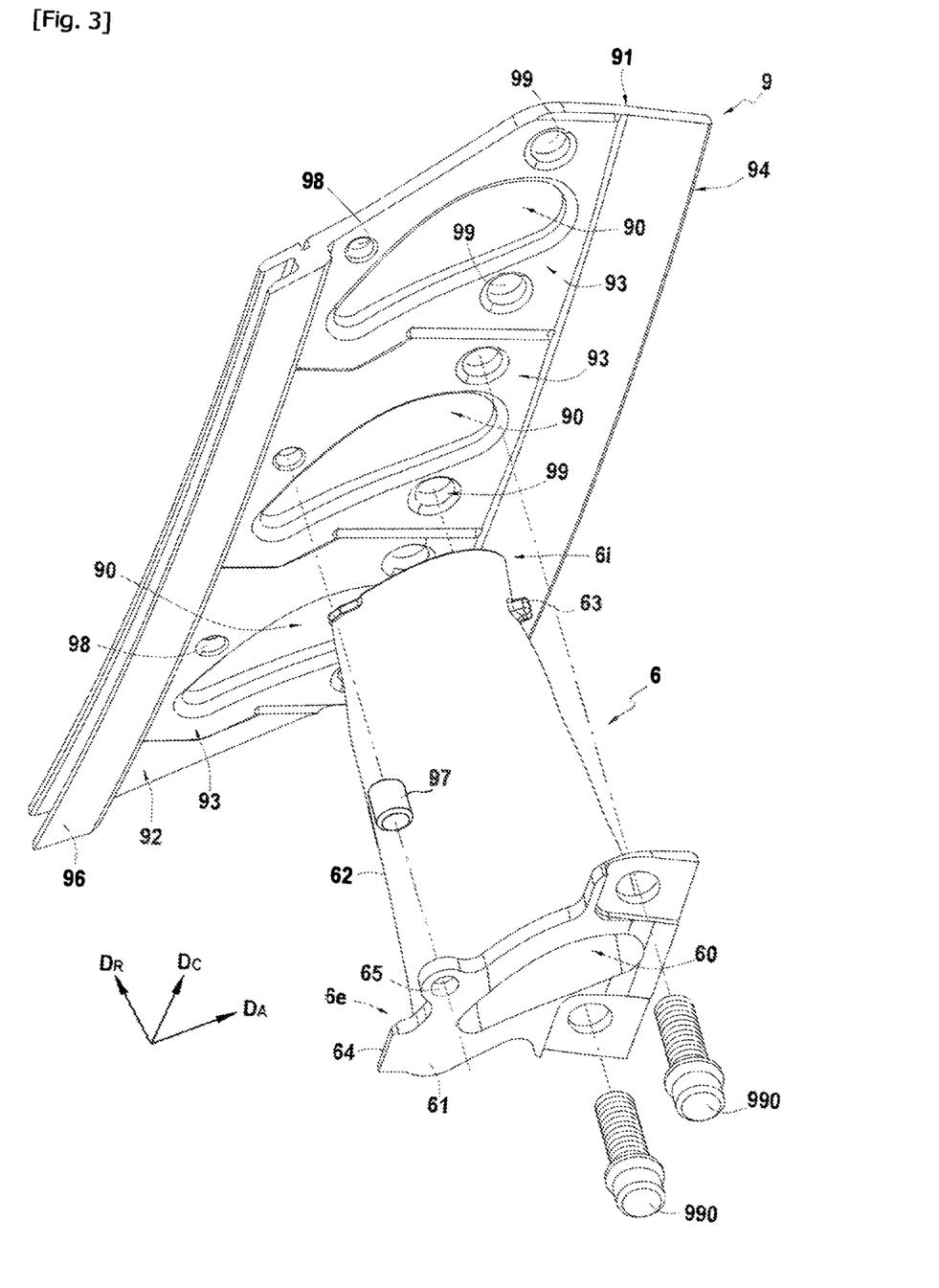
FIG. 3 shows an exploded schematic view of an external support shroud and a mast of the turbine of FIG. 1.

As illustrated in FIGS. 2 and 3 which show two schematic views of an outer support shroud 9 and of a mast 6 of the turbine 1 of the figure, the turbine 1 also comprises, for each nozzle sector 20, a mast 6 extending in the radial direction $D_R$. 1. In FIG. 2, the metal outer shroud 9 and the mast 6 are assembled, and in FIG. 3, the metal outer shroud 9 and the mast 6 are exploded.

As illustrated, the mast 6 comprises a mast head 61 supported on the outer surface 92 of the metal outer shroud 9, and a stem 62 protruding from the head 61 in the radial direction $D_R$ toward the inside and configured to pass through the metal outer shroud 9, the inner recess 280 of the airfoil 28 and the openings 245 and 265 of the inner 24 and outer 26 platforms being aligned with the inner recess 280 of the airfoil 28.

In other words, the mast 6 comprises a first radially inner end 6i and a second radially outer end 6e, a body 62 extending substantially in the radial direction $D_R$ between the first and second ends 6i and 6e of the mast 6, and a mast head 61 protruding in a plane orthogonal to the radial direction $D_R$ from the second end 6e of the mast 6. The mast head 61 forms a planar support extending in a plane orthogonal to the radial direction $D_R$.

The mast 6 is hollow to bring air in the cavity radially into the inner shroud so as to pressurize it and thus avoid air circulating in the stream extending between the inner and outer platforms of the nozzle sectors being reintroduced out of this stream and thus reducing the performance and increasing the risk of overheating of the parts. The mast 6 thus comprises an inner recess 60 extending in the radial direction $D_R$ between the first and second ends 6i and 6e of the mast 6.

The metal outer shroud 9 comprises openings 90 for receiving the mast 6 formed for the mast 6 to pass through them, and planar facets 93, each for receiving a supporting mast head 61.

The metal outer shroud 9 comprises an upstream end 94 and a downstream end 95 in the axial direction $D_A$. At its downstream end 95, the metal outer shroud 9 comprises a shoulder 96 extending in the radial direction $D_R$ over the entire circumference of the metal outer shroud 9. The metal outer shroud 9 also comprises, for each airfoil 28, and therefore for each mast 6, a centering pin 97 which is inserted into an opening 98 provided in the metal outer shroud 9. When the centering pin 97 is inserted into the opening 98, the pin 97 protruded in the radial direction $D_R$ from the radially outer face 92 of the metal outer shroud 9. The centering pins 97 are arranged, in this embodiment, on a downstream portion of the metal outer shroud 9, i.e. in proximity to the downstream end 95 of the metal outer shroud 9, between the shoulder 96 and the upstream end 94.

The downstream end 95 of the metal outer shroud 9 forms an open hook in the downstream direction for the attachment of the metal outer shroud 9 to the casing.

The mast head 61 comprises an anti-rotation support 64 extending in the circumferential direction $D_C$ supported in the axial direction $D_A$ against the shoulder 96 of the metal outer shroud 9 to retain the mast 6 and thus the airfoil 28 with which the mast 6 cooperates against any rotation around a radial axis. Each mast 6 also comprises a centering opening 65 formed to cooperate with one of the centering pins 97 of the metal outer shroud 9.

In the embodiment illustrated, the metal outer shroud 9 also comprises, for each mast 6, tapped openings 99 on an upstream portion and each mast 6 comprises upstream attachment openings 66 configured to superimpose themselves on the tapped openings 99 of the metal outer shroud 9 when the mast 6 is mounted on the metal outer shroud 9. The metal outer shroud 9 comprises screws 990 each passing through an upstream attachment opening 66 of the mast 6 and a tapped opening to attach the mast 6 to the metal outer shroud 9. The screws 990 are associated with means of retaining in radial position to retain a portion of the mast 6 on an upstream portion of the metal outer shroud 9.

To retain the airfoil 28 in position, the mast 6 also comprises two protruding portions 63 extending in a plane transverse to the radial direction $D_R$. In the embodiment illustrated in FIGS. 1 to 3, a first protruding portion 63 forms a first support at a first radial position and a second protruding portion 63 forms a second support at a second radial position. The first radial position is arranged inside the second radial position, i.e. between the center of revolution of the turbine 1 and the second radial position.

The first and the second supports form two spurs extending substantially in the axial direction $D_A$ over a portion of the mast 6 intended to be in the inner recess 280 of the airfoil 28. The two protruding portions 63 of the mast 6 each form an excrescence of which at least a part is in contact with the airfoil 28 to retain the airfoil 28 in position.

In addition, the inner support shroud 5 comprises openings configured to receive the masts 6. The mast 6 allows providing an upward attachment means of the CMC nozzle sector 20, i.e. to the casing, while minimizing the bending moment, inasmuch as the bending length is reduced roughly by half due to the mast 6 passing through the nozzle sector. Each nozzle sector 20 is thus retained deterministically, i.e. so as to avoid the nozzle sector 20 vibrating and controlling its position, this while still allowing the nozzle sector 20 to deform under the influence of temperature and pressure among others, independently of the interfaced metal parts.

In the case where each nozzle sector comprises several airfoils, the turbine would comprise, at most, a corresponding number of masts for each nozzle sector.

In a variant, the mast head 61 can comprise a plurality of protrusions extending from the second end 6e of the mast 6, certain of them comprising at least one of the elements for retaining or centering the mast 6.

The turbomachine turbine according to the invention comprises a turbine nozzle at least partially of CMC the assembly of which is simplified and adapted to retain its nozzle sectors deterministically while allow the sectors to deform independently of the interfaced metal parts, and while improving the sealing between the mast and the metal outer shroud.

Figure 4:
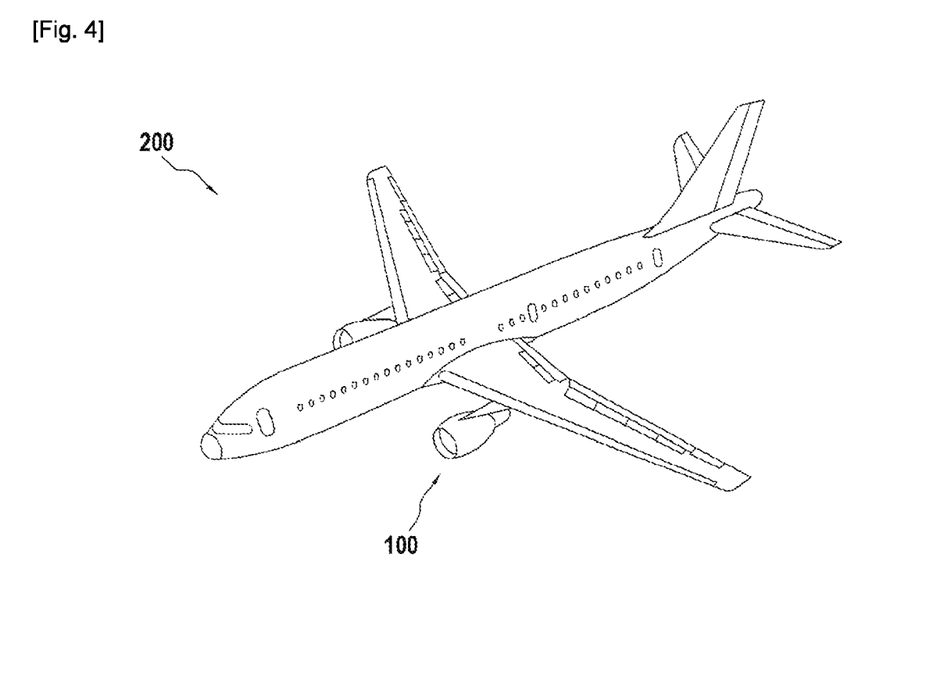
FIG. 4 shows an exemplary view of an aircraft.
Figure 5:
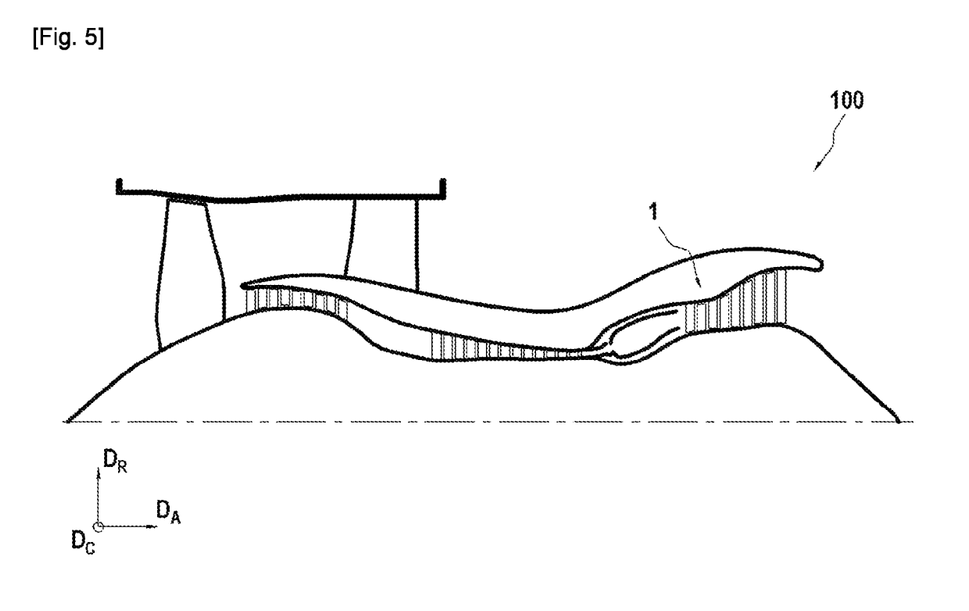
FIG. 5 shows a schematic view in a longitudinal plane of a turbomachine.

As illustrated in FIG. 4, which shows an exemplary view of aircraft 100, the aircraft 100 includes turbomachine 200. As illustrated in FIG. 5, which shows a schematic view in a longitudinal plane of turbomachine 200, turbomachine 200 includes turbine 1.

The invention claimed is:

1. A turbomachine turbine comprising a casing, an annular nozzle defining an axial direction and a radial direction, an outer support shroud of metal integral with the casing and an inner support shroud of metal, the nozzle comprising a plurality of nozzle sectors of ceramic matrix composite material forming a ring extending between the outer support shroud and the inner support shroud,
    each sector including a mast, an inner platform, an outer platform and at least one airfoil extending radially between the inner and outer platforms and having a hollow profile defining an inner recess extending radially, the inner and outer platforms each having an opening communicating with said inner recess of the airfoil,
    wherein the metal outer shroud comprises an opening for each mast, and for each sector the mast passes through said openings of the inner and outer platforms, said inner recess and one of the openings of the metal outer shroud, and the mast comprises at least one fastening projection to the outer support shroud having at least one portion extending from a radially outer end of the mast in a direction opposite to the center of the mast and in a plane orthogonal to the radial direction, said at least one fastening projection cooperating with a radially outer face of the outer support shroud,
    wherein the mast comprises at least one protruding portion extending in a plane transverse to the radial direction, and the at least one protruding portion forms a support at a radial position of the mast, in the inner recess of the airfoil, and is in contact with the inner recess of the airfoil, wherein the at least one protruding portion is disposed only on an axial upstream-facing surface of the mast.

2. The turbine according to claim 1, wherein the outer support shroud is a single piece.

3. The turbine according to claim 1, wherein said at least one fastening projection of the mast of each airfoil extends in a plane, and the radially outer face of the outer support shroud comprises a facet for receiving the fastening projection for each airfoil, each facet being planar.

4. The turbine according to claim 1, wherein the mast is hollow.

5. The turbine according to claim 1, wherein the outer support shroud comprises an upstream end and a downstream end in the axial direction, and a shoulder extending in the radial direction at one of the upstream or downstream ends of the outer shroud over the entire circumference of the outer support shroud, and the mast of each airfoil comprises an anti-rotation support of the mast relative to the outer support shroud protruding in the axial direction from the radially outer end of the mast until it is supported in the axial direction against the shoulder of the outer support shroud.

6. The turbine according to claim 1, wherein the outer support shroud also comprises, for each mast, a centering pin protruding radially from said radially outer face, and the fastening projection of each mast comprises a centering opening configured to cooperate with an associated centering pin.

7. The turbine according to claim 1, wherein the outer support shroud comprises, for each mast, screws and the fastening projection of each mast comprises tapped openings, each configured to cooperate with an associated screw.

8. The turbine according to claim 1,
    wherein the outer support shroud comprises, for each mast, a centering pin protruding radially from said radially outer face, and the fastening projection of each mast comprises a centering opening configured to cooperate with an associated centering pin,
    wherein the outer support shroud comprises, for each mast, screws and the fastening projection of each mast comprises tapped openings, each configured to cooperate with an associated screw, and
    wherein, for each sector, the screws are arranged downstream of the mast and the centering pin is arranged upstream of the mast.

9. The turbine according to claim 7, wherein the tapped openings are made in lugs provided in the fastening projection.

10. A turbomachine comprising a turbine according to claim 1.

11. An aircraft comprising at least one turbomachine according to claim 10.

12. The turbine according to claim 1, wherein the at least one protruding portion comprises a first protruding portion forming a first support at a first radial position and a second a second protruding portion forming a second support at a second radial position.

13. The turbine according to claim 12, wherein the first protruding portion and second protruding portion extend in the axial direction over a portion of the mast in the inner recess of the airfoil.

14. The turbine according to claim 13, wherein the first protruding portion and the second protruding portion are in contact with the airfoil.

* * * * *